(12) United States Patent
Nel

(10) Patent No.: US 7,353,181 B2
(45) Date of Patent: Apr. 1, 2008

(54) ALLOCATING FREIGHT HAULAGE JOBS

(75) Inventor: André M. E. Nel, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1315 days.

(21) Appl. No.: 09/930,640

(22) Filed: Aug. 15, 2001

(65) Prior Publication Data

US 2003/0036935 A1  Feb. 20, 2003

(51) Int. Cl.
   *G06Q 10/00* (2006.01)
(52) U.S. Cl. ............................................. 705/7; 705/8
(58) Field of Classification Search ............. 705/7, 705/8; 708/8
   See application file for complete search history.

(56) References Cited

U.S. PATENT DOCUMENTS

| | | | |
|---|---|---|---|
| 5,122,959 A | | 6/1992 | Nathanson et al. |
| 5,157,714 A | * | 10/1992 | Spicer .................... 379/88.24 |
| 5,265,006 A | * | 11/1993 | Asthana et al. ................ 705/8 |
| 5,424,524 A | * | 6/1995 | Ruppert et al. ............... 705/8 |
| 5,444,444 A | | 8/1995 | Ross |
| 5,623,413 A | * | 4/1997 | Matheson et al. .......... 701/117 |
| 5,719,771 A | | 2/1998 | Buck et al. |
| 5,742,914 A | | 4/1998 | Hagenbuch |
| 5,835,376 A | | 11/1998 | Smith et al. |
| 5,835,377 A | * | 11/1998 | Bush ........................... 700/99 |
| 5,835,716 A | * | 11/1998 | Hunt et al. ................. 709/213 |
| 5,880,958 A | | 3/1999 | Helms et al. |
| 6,035,289 A | | 3/2000 | Chou et al. |
| 6,098,877 A | | 8/2000 | Barkan et al. |
| 6,112,152 A | | 8/2000 | Tuttle |
| 6,148,291 A | | 11/2000 | Radican |
| 6,219,653 B1 | | 4/2001 | O'Neill et al. |
| 6,385,537 B2 | * | 5/2002 | Gaspard, II ................ 701/209 |
| 6,411,897 B1 | * | 6/2002 | Gaspard, II ................ 701/209 |
| 6,429,810 B1 | * | 8/2002 | De Roche .............. 342/357.07 |

(Continued)

FOREIGN PATENT DOCUMENTS

WO    WO 00/49530    8/2000

(Continued)

OTHER PUBLICATIONS

"Off the wire", Aug. 1998, Fleet Owner, vol. 93, Iss 8, p. TC5, ProQuest ID 33739571.*

(Continued)

*Primary Examiner*—Romain Jeanty
*Assistant Examiner*—Jonathan G Sterrett

(57) ABSTRACT

In one aspect, a global freight haulage job manager is configured collect excess capacity information and freight haulage job information on the fly, and automatically match freight haulage jobs to excess capacity in real time. The global freight haulage job manager is configured to receive carrier capacity attributes, including position information, route information and excess capacity information, for each of a set of mobile carrier entities, and to receive from one or more shippers shipping attributes for each of a set of freight haulage jobs. Based upon the received mobile carrier capacity attributes, the global freight haulage job manager is configured to compute a projection of available carrier capacity. One or more freight haulage job candidates then are identified from the set of mobile carrier entities based upon the computed projection of available carrier capacity and the received shipping attributes for the set of freight haulage jobs.

20 Claims, 5 Drawing Sheets

U.S. PATENT DOCUMENTS

| | | | |
|---|---|---|---|
| 6,453,298 B2 * | 9/2002 | Murakami et al. | 705/8 |
| 6,701,299 B2 * | 3/2004 | Kraisser et al. | 705/8 |
| 6,862,572 B1 * | 3/2005 | de Sylva | 705/7 |
| 6,879,962 B1 * | 4/2005 | Smith et al. | 705/22 |
| 7,222,081 B1 * | 5/2007 | Sone | 705/7 |
| 7,243,074 B1 * | 7/2007 | Pennisi, Jr. | 705/8 |
| 2002/0019760 A1 * | 2/2002 | Murakami et al. | 705/8 |
| 2002/0026342 A1 * | 2/2002 | Lane et al. | 705/8 |
| 2002/0055818 A1 * | 5/2002 | Gaspard, II | 701/209 |
| 2002/0065698 A1 * | 5/2002 | Schick et al. | 705/8 |
| 2002/0072945 A1 * | 6/2002 | Yang | 705/8 |
| 2002/0077876 A1 * | 6/2002 | O'Meara et al. | 705/8 |
| 2002/0138352 A1 * | 9/2002 | DeMaggio | 705/22 |
| 2002/0180617 A1 * | 12/2002 | Doyle | 340/988 |
| 2003/0004769 A1 * | 1/2003 | Soga et al. | 705/7 |
| 2003/0009361 A1 * | 1/2003 | Hancock et al. | 705/7 |
| 2003/0043761 A1 * | 3/2003 | Hladik | 370/319 |
| 2003/0069771 A1 * | 4/2003 | Menninger et al. | 705/7 |
| 2004/0034556 A1 * | 2/2004 | Matheson et al. | 705/8 |
| 2004/0111309 A1 * | 6/2004 | Matheson et al. | 705/8 |
| 2005/0114188 A1 * | 5/2005 | Soga et al. | 705/7 |

FOREIGN PATENT DOCUMENTS

| | | | |
|---|---|---|---|
| WO | WO 00/68859 | * | 11/2000 |

OTHER PUBLICATIONS

Leavitt, Wendy, www.productivity.com, Jan. 2000, Fleet Owner, Iss 1, p. 19, ProQuest ID 49011151.*

"The National Transportation Exchange", web.archive.org webpages of Sep. 2, 1999, Press Release of Sep. 8, 1997. pp. 1-3.*

Raskob, John, "Managing the Supply Chain", Mar./Apr. 2000, Ivey Business Journal, vol. 64, Iss 4, p. 52, ProQuest ID 68834588.*

Business Wire, "CFI's Surfside Announces Partnership with Qualcomm and other leading Infrastructure Providers", Jul. 24, 2000, New York, ProQuest ID 56782725.*

Gumaer, Robert, "Beyond ERP and MRP II", Sep. 1996, IIE Solutions, vol. 28, Iss 9, p. 32, ProQuest ID 10136370.*

"Warehouse Management Logistics", Jun. 2000, Frontline Solutions, vol. 1, Iss 7, p. 22, ProQuest ID 56151681.*

"Carriers FAQ", NTE.net web.archive.org webpages of Mar. 2, 2000, pp. 1-6.*

"The National Transportation Exchange", web.archive.org webpages of Sep. 2, 1999, Press Release of Sep. 11, 1998, pp. 1-2.*

Harvey, Joseph, "Better distribution through technology", Aug. 2000, Beverage World, v119n1693, pp. 54, Dialog 02059939 59210696.*

Cox, John, "Working the wireless web", Apr. 2000, Network World, v17n15, pp. 1, Dialog 02010872 52522401.*

Harrington, Lisa H, "High tech trucking improves fleet performance", Oct. 1999, Transportation and Distribution, v40n10, pp. 53-62, Dialog 01913932 05-64924.*

"ARINC", May 2000, Trucking Technology, v7, n2, p. 19, Dialog 07623104 62919232.*

Rating/Routing Software: Make special deliveries routine, Nov. 1996, Transportation and Distribution, p. 60, Dialog 04653307 46845880.*

Business Editors & Computer/Electronics Writers, "Qualcomm 3: Qualcomm announces agreement in principle to remarket IBM RoadRider OBC to OmniTRACS customers", Nov. 1, 1993, Orlando, Florida, Dialog 0366223.*

"Runnin' on Data", Apr. 1995, US Distribution Journal, p. 22, Dialog 03829953.*

Gormley, Mal, "Tracking the Fleet", Jul. 1997, Business & Commercial Aviation, vol. 81, No. 1, p. 90, Dialog 00867557.*

Nehls, Carl, "Custodial Package Tracking at Federal Express", 1988, National Academy of Engineering, books.nap.edu/books/030903891X/html/57.html, pp. 57-81.*

Marshall, Lawson; "Data: Captured Then Used", Jul. 1996, Fleet Equipment; ABI/INFORM Global, p. S6.*

Business/High-Tech Editors,"@Track to Equip Jet Corr's Fleet with Trackware Trailer-Tracking System", Jun. 13, 2001, Business Wire, New York, ProQuest 74061770.*

Harrington, Lisa; "High tech trucking improves fleet performance", Oct. 1999, Transportation & Distribution, Cleveland, vol. 40, Iss. 10, p. 53, 6 pgs, ProQuest ID 45962319.*

Skydel, Seth; "Growth enabled by technology", Dec. 2000, Fleet Equipment, Palatine, vol. 26, Iss. 12, p. 38, 3 pgs, ProQuest ID 66024622.*

"Pen*key 6622 Lightweight power house for Mobile Applications", Norand.com, web.archive.org webpage of Feb. 6, 1998, p. 1-2.*

"The Automation Solution", Norand.com, web.archive.org webpage of Feb. 6, 1998, p. 1-2.*

"Return on Investment Model", Norand.com, web.archive.org webpage of Feb. 6, 1998, pp. 1-5.*

Muralidharan, B; "Dynamic Routing and Service Network Design for less-than-truckload (LTL) Motor Carriers", 1997, Iowa State University, Ames, Iowa, PhD Dissertation, pp. 1-94.*

Leavitt, Wendy; "All Work and Play", Nov. 2000, Fleet Owner, 95, 11; ABI/INFORM Global, p. 75.*

Ichoua, Soumia, et al. "Diversion Issues in Real-Time Vehicle Dispatching", Nov. 2000, Transportation Science, 34, 4; ABI/INFORM Global, p. 426.*

Mele, Jim; "A New Wireless World", Jun. 2001, Fleet Owner, Overland Park, vol. 96, Iss. 6, p. 88, ProQuest ID 74324501.*

Cheung, Raymond K; Muralidharan, B.; "Dynamic Routing for Priority Shipments in LTL Service Networks", Feb. 2000, Transportation Science, 34; 1, ABI/INFORM Global, p. 86.*

Cheung, Raymond K; Muralidharan, B.; "Impact of Dynamic decision making on hub-and-spoke freight transportation networks", 1999, Annals of Operations Research, 87, ABI/INFORM Global, p. 49.*

Dynamic and stochastic models with freight distribution applications by Kleywegt, Anton Jan, Ph.D., Purdue University, 1996, 222 pages; AAT 9713537.*

Business Editors, "CargoReservations.com Launches Real-time B2B Exchange for Air Cargo Industry; Open System Created to Increase Fleet Utilization, Fill Excess Capacity, Reduce Unit Costs", Business Wire, Oct. 12, 2000.*

* cited by examiner

ALLOCATING FREIGHT HAULAGE JOBS

TECHNICAL FIELD

This invention relates to systems and methods for allocating freight haulage jobs.

BACKGROUND

The demand for shipping freight has increased steadily over the years. To satisfy this demand, freight hauling (or carrier) companies have created vast fleets of mobile carrier vehicles for each of a variety of different transportation modes (e.g., ground, air, rail, or ship). The resulting increase in the scale of operations, as well as a general increase in the competition in the freight hauling industry, has driven the need for increased efficiency in handling high volumes of parcels and providing a large number of carrier services.

Many different systems and methods for improving efficiencies in the freight hauling industry have been proposed. For example, U.S. Pat. No. 5,880,958 has proposed a system and method for assigning tractor vehicles to freight loads within a freight transportation system. The system includes a satellite navigation subsystem that provides vehicle and load position data from which the locations of each tractor vehicle and freight load may be determined. A set deadhead distances that are required to be traversed by tractor vehicles unencumbered with freight loads while en route to load pick-up locations also may be determined from the position data. The system also determines multiple potential pick-up times at which the freight loads may become available for engagement by tractor vehicles at selected pick-up locations. Each unencumbered tractor vehicle then may be matched efficiently with an available freight load in accordance with matching criteria that may be based upon, for example, the compiled sets of deadhead distances and potential pick-up times. In addition, the satellite position data may be used to improve fleet utilization by reassigning tractor vehicles currently encumbered with freight loads through calculation of expected time of availability subsequent to load delivery.

The ability of a mobile carrier vehicle to respond to a shipper's needs at any given time depends directly on the carrier vehicle's current capacity, which is the space that is currently available in the mobile carrier vehicle, and the current location of the mobile carrier vehicle. More often than not, carrier vehicles have "excess capacity" (i.e., the maximum available space in the carrier vehicle is not fully utilized). Excess capacity represents revenue or opportunity lost to the carrier.

U.S. Pat. No. 5,835,716 has proposed a method for brokering carrier capacity. In accordance with this method, carrier capacity is entered into a transportation database in the form of a list of parameters, which may include: amount of space available; destination; dates and times; rates; and mode of transport (e.g., air, ground, ship, rail, or mixed modal). Requests for available capacity also are entered into the transportation database in the form of a list of parameters that define a requested shipment route. Such parameters may include: amount of space required; destination; dates and times; rates; and mode of transport. A data processing system identifies matches between the request for available capacity and the capacity that has been entered into the transportation database. The system operator making the request for carrier capacity may display the request made and the matching capacity entries that have been identified by the data processing system. The system operator may select an appropriate matched entry from among those displayed. The selection then must be confirmed. Upon confirmation, the selected matched entry is saved to a transaction database and assigned a transaction code. The assignment of a transaction code may be the initiating step in preparing a bill for services or generating a transaction report.

In another effort to improve efficiencies in the freight hauling industry, U.S. Pat. No. 6,035,289 has proposed a web-based trading system that receives, by electronic media, one or more asks from each of a plurality of carrier entities, and one or more bids from each of a plurality of shipping entities. Each of the asks and bids are stored as a record in a general purpose programmable digital computer. Each ask record includes data representing an available cargo capacity, an origin of shipment, an offered departure time window, an offered shipment destination, an offered destination arrival time window, and an ask price. Similarly, each bid record includes data representing a certain volume or weight of goods that need to be transported, a required shipping origin, a required shipping destination, a required departure time window, a required arrival time window, and a bid price. The trading system then performs a double auction bid-ask matching process that iteratively matches the bids to the asks to obtain a maximum number of matches based upon a plurality of matching constraints. The matching constraints are based upon the respective shipping origins and shipping destinations, time windows, available cargo capacities, required volume or weight of goods, and ask and bid prices contained in the bid and ask records.

SUMMARY

In one aspect, the invention features a novel scheme (systems and methods) for allocating freight haulage jobs. In accordance with this inventive scheme, carrier capacity attributes, including position information, route information and excess capacity information, are received for each of a set of mobile carrier entities. Based upon the received mobile carrier capacity attributes, a projection of available carrier capacity is computed. One or more freight haulage job candidates then are identified from the set of mobile carrier entities based upon the computed projection of available carrier capacity and shipping attributes for each of a set of freight haulage jobs.

In accordance with this aspect of the invention, a mobile carrier entity may be notified of freight haulage job attributes while on route to a destination for a current freight haulage job. In this way, mobile carrier entities may readily fill any excess capacity that they have at any particular time. In addition, the invention provides a centralized scheme for collecting excess capacity information and freight haulage job information on the fly, and automatically matching freight haulage jobs to excess capacity in real time.

Embodiments in accordance with this aspect of the invention may include one or more of the following features.

The step of computing the projection of available carrier capacity may include estimating future positions of one or more of the mobile carrier entities. Future positions of one or more of the mobile carrier entities may be estimated at one or more times within pickup time windows specified for each of the freight haulage jobs. In some embodiments, future positions of one or more of the mobile carrier entities are estimated based at least in part upon current transport condition information. The freight haulage job candidates may be identified based at least in part upon the proximity of the estimated mobile carrier entity positions to pickup locations specified for each of the freight haulage jobs.

The received excess capacity information preferably includes amount of available capacity and mode of transport. The freight haulage job candidates may be identified based at least in part upon a comparison of the received excess capacity information and an amount of needed capacity and mode of transport specified for each of the freight haulage jobs.

One or more of the received capacity attributes may be updated periodically.

An amount of capacity available on a given mobile carrier entity may be computed based upon excess capacity information received from the given mobile carrier entity. The excess capacity information may include maximum volume information and maximum weight haulable by the given mobile carrier entity and volume information and weight for each item of freight being hauled by the given mobile carrier entity.

In another aspect, the invention features a portable device, comprising: a memory; a wireless transceiver; a positioner that is operable to compute position information; a scanner that is operable to direct a light beam at a symbol and to recover information embedded in the symbol based upon detected reflections from the symbol; and a controller. The controller is coupled to the memory, the wireless transceiver, the positioner, and the scanner. The controller is operable to obtain from the scanner capacity attributes, including position information, route information and excess capacity information, for a mobile carrier entity and to control wireless transmission of the capacity attributes through the wireless transceiver in accordance with a mobile wireless communication protocol.

In some embodiments, the positioner comprises a GPS receiver. The controller may be operable to compute excess capacity information from scanned information relating to maximum volume information and maximum weight haulable by a given mobile carrier entity and volume information and weight for each item of freight being hauled by the given mobile carrier entity.

In accordance with this aspect of the invention, an operator of a mobile carrier entity may easily obtain excess capacity information and wirelessly communicate that information to the freight haulage job allocation system. For example, the operator may simply scan a bar code or other symbol that is attached to, for example, the container (e.g., trailer) carrier by the mobile carrier entity. The bar code symbol may include embedded information relating to, for example, the volume and weight capacity of the container. In addition, each time an item of freight is loaded into the container, the mobile carrier entity operator may scan a similar bar code symbol that is attached to the freight item and that specifies, for example the dimensions (or volume) and weight of the freight.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
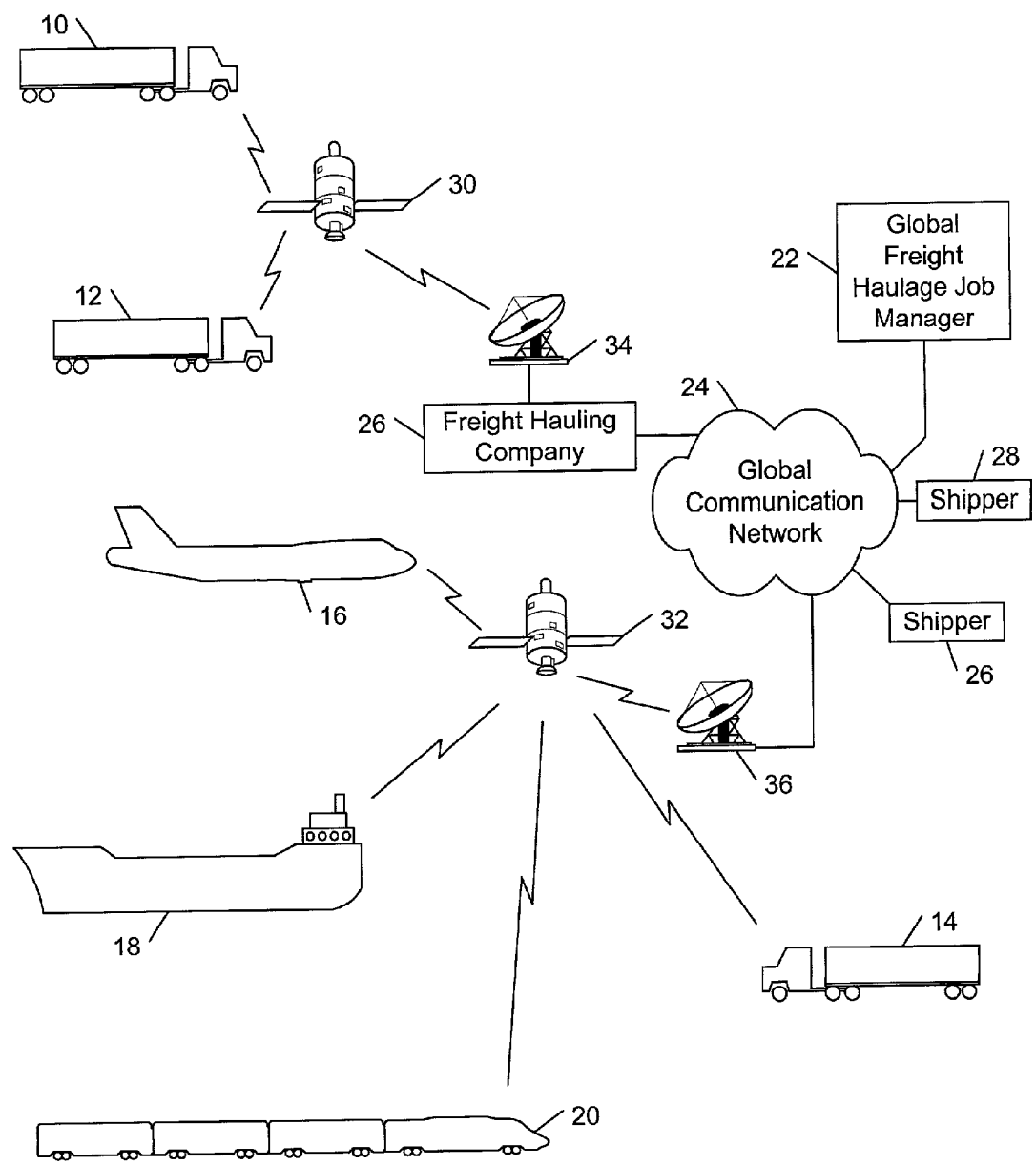
FIG. 1 is a diagrammatic view of a plurality of mobile carrier entities and a plurality of shippers communicating with a global freight haulage job manager over a global communication network.

Referring to FIG. 1, in one embodiment, a plurality of mobile carrier entities, including trucks 10, 12, 14, a plane 16, a cargo ship 18, and a freight train 20, may communicate with a global freight haulage job manager 22 over a global communication network 24. Mobile carrier entities 10-20 may communicate with global freight haulage job manager 22 directly, or indirectly through an intermediary. For example, trucks 10, 12 may be part of a trucking fleet owned by a freight hauling company 26, which is configured to coordinate the assignment of freight haulage jobs to trucks 10, 12 and communicate with global freight haulage job manager 22 on their behalf. Each of the mobile carrier entities 16-20 also may be part of a respective carrier fleet that is owned by a respective freight hauling company, or they may operate independently of other carriers. A plurality of shippers 26, 28 (e.g., commercial wholesale and retail shippers) also may communicate with global freight haulage job manager 22 over global communication network 24.

As explained in detail below, global freight haulage job manager 22 is configured collect excess capacity information and freight haulage job information on the fly, and automatically match freight haulage jobs to excess capacity in real time. In particular, global freight haulage job manager 22 is configured to receive carrier capacity attributes, including position information, route information and excess capacity information, for each of mobile carrier entities 10-20, and to receive from shippers 26, 28 shipping attributes for each of a set of freight haulage jobs. Based upon the received mobile carrier capacity attributes, global freight haulage job manager 22 is configured to compute a projection of available carrier capacity. One or more freight haulage job candidates then are identified from the set of mobile carrier entities 10-20 based upon the computed projection of available carrier capacity and the received shipping attributes for the set of freight haulage jobs. In this way, a mobile carrier entity may be notified of freight haulage job attributes while on route to a destination for a current freight haulage job and, thereby, fill any excess capacity that it may have at any particular time.

In the illustrated embodiment, each mobile carrier entity 10-20 includes a mobile communication unit (an example of which is described below in connection with FIGS. 4A and 4B) that is configured to transmit and receive data wirelessly over a communication link provided by a respective orbiting satellite communication system 30, 32. Satellite communication systems 30, 32 communicate wirelessly with respective satellite ground stations 34, 36 that, in turn, communicate with freight hauling company 26 or global communication network 24 over, for example, a conventional fixed line connection. In other embodiments, mobile carrier entities 10-20 may communicate with freight hauling company 26 and global communication network 24 in accordance with other wireless communication protocols (e.g., a cellular telephone communication protocol, such as AMPS, GSM, TDMA, and CDMA).

In the illustrated embodiment, each mobile carrier entity 10-20 also includes a positioning receiver (or positioner; an example of which is described below in connection with FIGS. 4A and 4B) that is configured to receive position information from satellite communication systems 30, 32 or from one or more other satellites that are part of a separate satellite navigation system (e.g., LORAN or GPS (Global Position System)). The position information may be transmitted to the positioning receivers in accordance with a conventional data transfer format (e.g., a Standard-C data protocol format). In other embodiments, a different navigation or positioning system may be used. For example, a series of radio repeaters that are located along a predetermined route may track the location of one or more of the mobile carrier entities 10-14 and transmit the position information to global freight haulage job manager 22.

Global communication network 24 may include a number of different computing platforms and transport facilities, including a voice network, a wireless network, and a computer network. Available capacity attribute and freight haulage job attributes may be transmitted, and freight haulage job notifications may be presented in a number of different media formats, such as voice, Internet, e-mail and wireless formats. In this way, global freight haulage job manager 22 enables mobile carrier entities 10-20 and shippers 26, 28 to access the job allocation services provided by global freight haulage job manager 22 using any one of a wide variety of different communication devices. For example, in one illustrative implementation, a wireless device (e.g., a wireless personal digital assistant (PDA)) may connect to global freight haulage job manager 22 over a wireless network. Communications from the wireless device may be in accordance with the Wireless Application Protocol (WAP). A wireless gateway converts the WAP communications into HTTP messages that may be processed by global freight haulage job manager 22. In another illustrative implementation, a voice device (e.g., a conventional telephone) may connect to global freight haulage job manager 22 over a voice network. Communications from the voice device may be in the form of conventional analog or digital audio signals, or they may be formatted as VoxML messages. A voice gateway may use speech-to-text technology to convert the audio signals into HTTP messages; VoxML messages may be converted to HTTP messages based upon an extensible style language (XSL) style specification. The voice gateway also may be configured to receive from global freight haulage job manager 22 real time audio messages that may be passed directly to the voice device. Alternatively, global freight haulage job manager 22 may transmit formatted messages (e.g., VoxML, XML, WML, e-mail) that must be converted to a real time audio format (e.g., using text-to-speech technology) before the messages may be passed to the voice device. In a third illustrative implementation, a software program operating at a client personal computer (PC) located at, for example, the premises of freight hauling company 26, may access the job allocation services of global freight haulage job manager 22 over the Internet.

Figure 2:
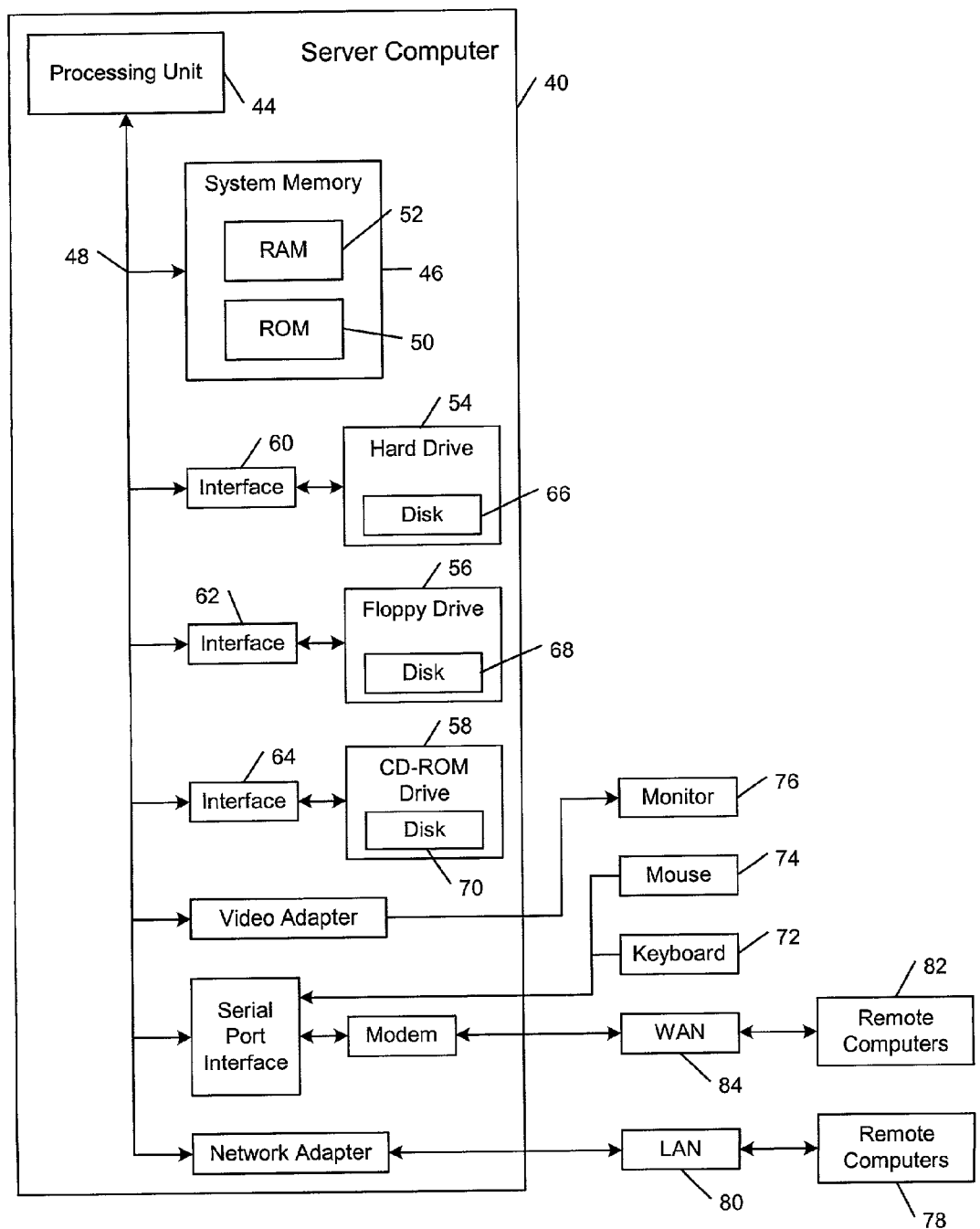
FIG. 2 is a block diagram of a server computer on which the global freight haulage job manager of FIG. 1 may operate.

Referring to FIG. 2, in one embodiment, global freight haulage job manager 22, as well as service access software operating at freight hauling company 26 and satellite ground stations 34, 36, may communicate and pass digital information over a conventional distribution network infrastructure (e.g., the Internet or a proprietary bulletin board service infrastructure). Accordingly, in this embodiment, each of these entities may be implemented as one or more respective software modules operating on a respective server computer 40 that is connected to a conventional 5 telephone or cable network. Server computer 40 includes a processing unit 44, a system memory 46, and a system bus 48 that couples processing unit 44 to the various components of server computer 40. Processing unit 44 may include one or more processors, each of which may be in the form of any one of various commercially available processors. System memory 46 includes a read only memory (ROM) 50 that stores a basic input/output system (BIOS) containing start-up routines for server computer 40, and a random access memory (RAM) 52. System bus 48 may be a memory bus, a peripheral bus or a local bus, and may be compatible with any of a variety of bus protocols, including PCI, VESA, Microchannel, ISA, and EISA. Server computer 40 also includes a hard drive 54, a floppy drive 56, and CD ROM drive 58 that are connected to system bus 48 by respective interfaces 60, 62, 64. Hard drive 54, floppy drive 56, and CD ROM drive 58 contain respective computer-readable media disks 66, 68, 70 that provide non-volatile or persistent storage for data, data structures and computer-executable instructions. Other computer-readable storage devices (e.g., magnetic tape drives, flash memory devices, and digital video disks) also may be used with server computer 40. A user may interact (e.g., enter commands or data) with server computer 40 using a keyboard 72 and a mouse 74. Other input devices (e.g., a microphone, joystick, or touch pad) also may be provided. Information may be displayed to the user on a monitor 76. Server computer 40 also may include peripheral output devices, such as speakers and a printer. One or more remote computers 78 may be connected to server computer 40 over a local area network (LAN) 80, and one or more remote computers 82 may be connected to server computer 40 over a wide area network (WAN) 84 (e.g., the Internet).

Figure 3A:
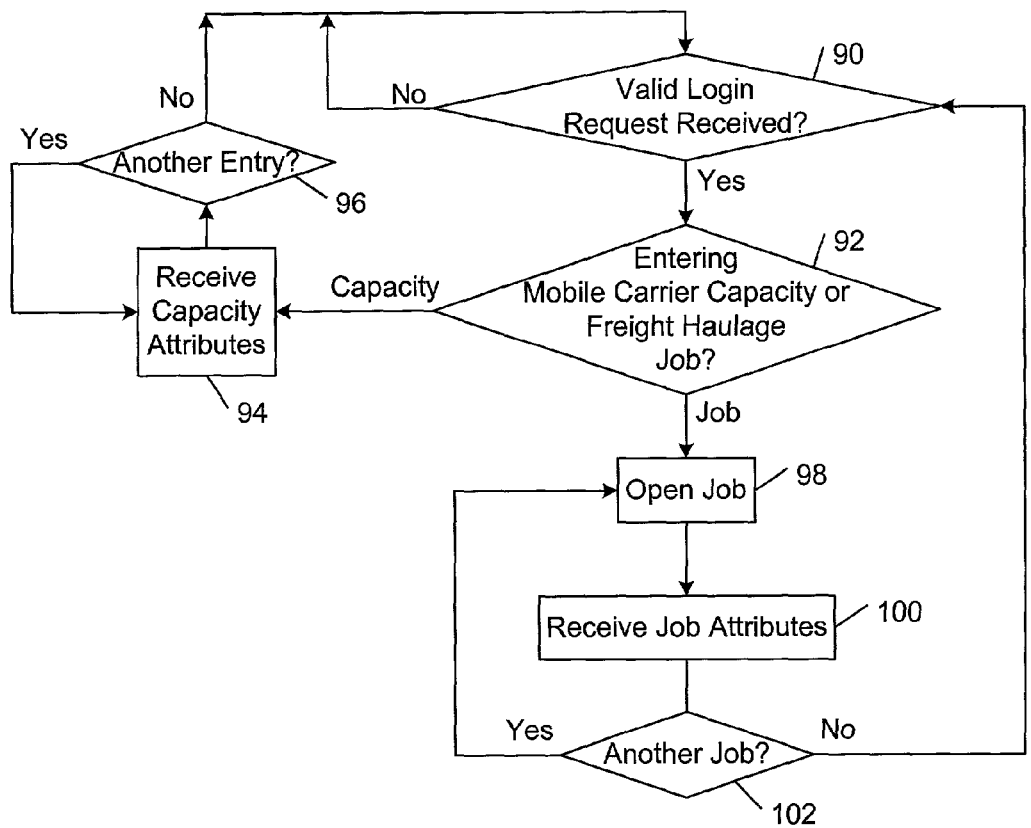
FIG. 3A is a flow diagram of a method by which the global freight haulage job manager of FIG. 1 may receive carrier capacity attributes and job attributes from the mobile carrier entities and shippers of FIG. 1, respectively.

Referring to FIG. 3A, in one embodiment, global freight haulage job manager 22 may respectively receive carrier capacity attributes and job attributes from mobile carrier entities 10-20 and shippers 26, 28, as follows. Global freight haulage job manager 22 stands by until a login request is received from either a mobile carrier entity 10-20, a shipper 26, 28, or a third-party (e.g., freight hauling company 26) that is acting on behalf of a mobile carrier entity or a shipper (step 90). In one embodiment, only users who have registered previously with global freight haulage job manager 22 are allowed to access the freight job allocation services provided by global freight haulage job manager 22. When a valid login request is received (step 90), global freight haulage job manager 22 determines whether mobile carrier capacity information or freight haulage job information is being entered (step 92).

If mobile carrier capacity is being entered into the system (step 92), global freight haulage job manager 22 queries the user for a set of prescribed mobile carrier capacity attributes (step 94), including one or more of the following attributes:

current position information;

excess capacity information (expressed, e.g., in terms of volume and weight available);

route information (e.g., drop off location and any planned intermediate stops), dates and times;

arrival time window;

rates (expressed, e.g., in terms of cost per unit of distance traveled); and mode of transport information (e.g., ground, ship, air, or rail).

After the carrier capacity attributes have been entered (step 94), global freight haulage job manager 22 queries the user whether capacity information for another mobile carrier entity is to be entered (step 96). If so, global freight haulage job manager 22 queries the user for another set of prescribed mobile carrier capacity attributes (step 94). Otherwise, global freight haulage job manager 22 stands by until another login request is received (step 90).

If freight haulage job information is being entered (step 92), global freight haulage job manager 22 opens a new freight haulage job (step 98) and queries the user for a set of prescribed freight haulage job attributes (step 100), including one or more of the following attributes:

amount of capacity needed (expressed, e.g., in terms of volume and weight needed to be shipped);

route information (e.g., pick-up and drop off locations);

pick-up and drop off time windows mode of transport; and bid price

In some embodiments, the user may elect to enter information relating to only a subset of the prescribed freight haulage job attributes and, thereby, increase the likelihood of finding a matching mobile carrier entity. After the freight haulage job attributes have been entered (step 100), global freight haulage job manager 22 queries the user whether information for another freight haulage job is to be entered (step 102). If so, global freight haulage job manager 22 opens another job (step 98) and queries the user for another set of prescribed freight haulage job attributes (step 100). Otherwise, global freight haulage job manager 22 stands by until another login request is received (step 90).

Figure 3B:
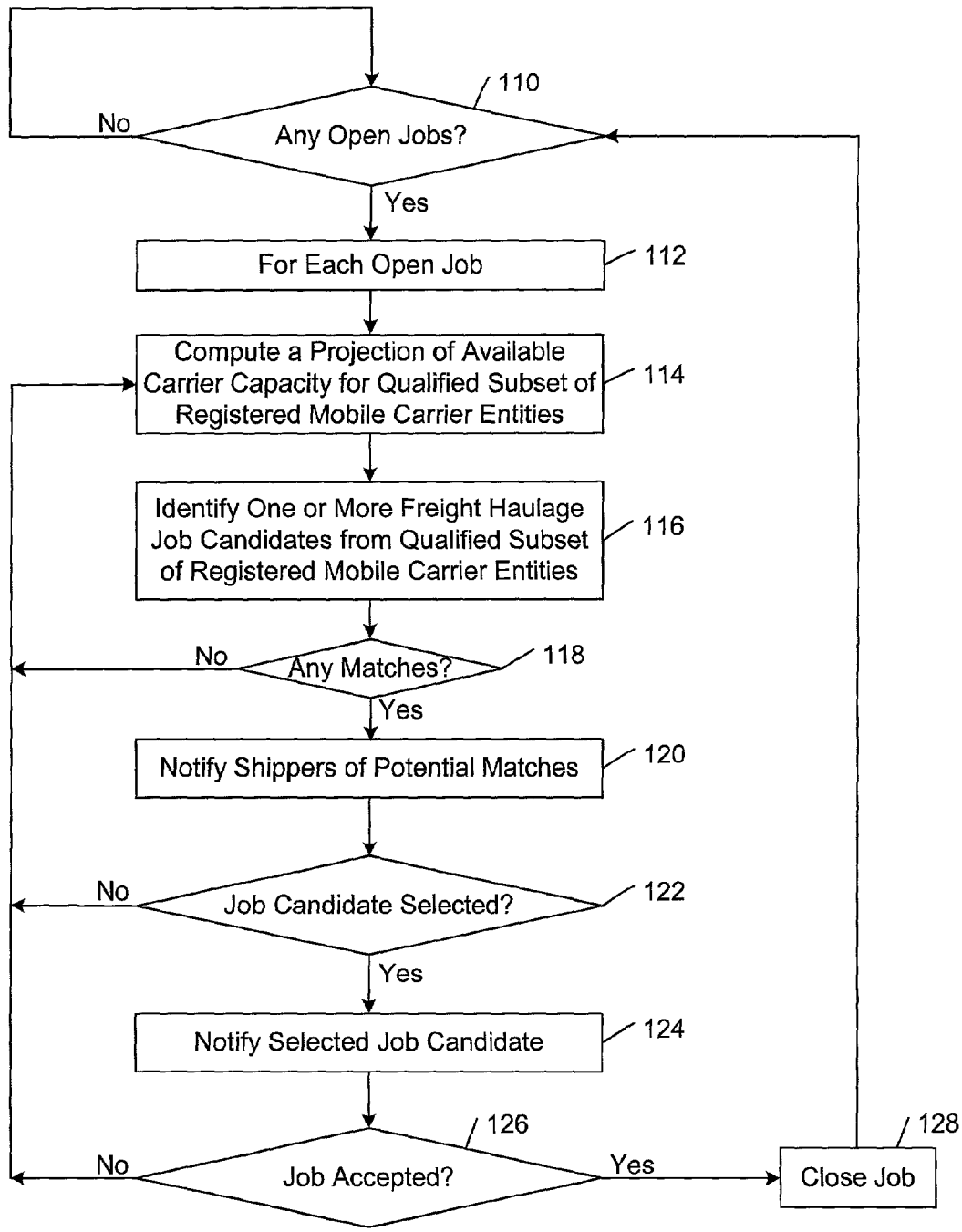
FIG. 3B is a flow diagram of a method by which the global freight haulage job manager of FIG. 1 may allocate freight haulage jobs to the mobile carrier entities of FIG. 1.

As shown in FIG. 3B, in one embodiment, global freight haulage job manager 22 may allocate freight haulage jobs to mobile carrier entities 10-20, as follows. Global freight haulage job manager 22 stands by until a freight haulage job is opened (step 110). For each open job (step 112), global freight haulage job manager 22 computes a projection of available carrier capacity for a qualified subset of the mobile carrier entities that are registered with the system (step 114). Mobile carrier entities having excess capacity in an amount that is equal to or greater than the capacity amount needed for a particular freight haulage job and having a rate that is less than or equal to the bid price for the job (if one is specified) are selected to be members of the qualified subset of mobile carrier entities. The projection of available carrier capacity may be computed by estimating the positions of the mobile carrier entities in the qualified subset at one or more times within the pick-up time window specified for the job. The position estimates may be computed based upon, for example, current mobile carrier positions, current mobile carrier destinations, expected average mobile carrier travel speed, and current transport conditions (e.g., road or flight conditions) along the projected mobile carrier routes.

Next, one or more freight haulage job candidates are identified from the qualified subset of mobile carrier entities (step 116). The freight haulage job candidates may be identified based at least in part upon the proximity of the estimated mobile carrier entity positions to the pick-up location that is specified for the particular freight haulage job. In general, freight haulage job candidates will be located within a prescribed divergence distance of the pick-up location at some time before the end of the specified pick-up time window. The divergence distance corresponds to the distance a mobile carrier entity may be willing to stray from its current transport route in order to pick-up the shipment for a particular freight haulage job. The divergence distance may be specified by each of the mobile carrier entities at the time the excess capacity is entered into the system. Alternatively, global freight haulage job manager 22 may select a default divergence distance that is appropriate for the transportation mode of the mobile carrier entity and current transport conditions (if known).

If there are any registered mobile carrier entities that potentially match the criteria specified for a particular freight haulage job (step 118), global freight haulage job manager 22 notifies the shipper who registered that job of one or more of the matching mobile carrier entities (step 120). If there are no matching mobile carrier entities, global freight haulage job manager 22 periodically computes a new projection of available carrier capacity (step 114) until one or more potential matches are identified (step 116). The new carrier capacity projection may reflect additional carrier capacity or carrier capacity updates that may not have been reflected in the previous projection. Global freight haulage job manager 22 may notify the shipper of all of the matching mobile carrier entities, or it may select only one or several of the matching mobile carrier entities based upon a prescribed selection criteria (e.g., lowest rate). If the shipper does not select any of the identified matching mobile carrier entities (step 122), global freight haulage job manager 22 computes a new projection of available carrier capacity (step 114) and repeats the process (steps 116-122); the new carrier capacity projection may reflect additional carrier capacity or carrier capacity updates that may not have been reflected in the previous projection. If a freight haulage job candidate is selected (step 122), global freight haulage job manager 22 notifies the selected mobile carrier entity of the job opportunity (step 124). If the mobile carrier entity accepts the job (step 126), global freight haulage job manager 22 closes the job (step 128) and repeats the process (steps 110-128). Otherwise, global freight haulage job manager 22 computes a new projection of available carrier capacity (step 114) and repeats the process (steps 116-126); the new carrier capacity projection may reflect additional carrier capacity or carrier capacity updates that may not have been reflected in the previous projection.

In some embodiments, the mobile communication unit and the positioning receiver carried by each mobile carrier entity 10-20 may be incorporated into a single portable device. The portable device also may include an optical scanner module that is configured to allow an operator of a mobile carrier entity to readily obtain excess capacity information. In accordance with these embodiments, the operator may simply scan a bar code or other symbol that is attached to, for example, the container (e.g., trailer) that is carried by the mobile carrier entity. The bar code symbol may include embedded information relating to, for example, the dimensions (or volume) and weight capacity of the container. In addition, each time an item of freight is loaded into the container, the mobile carrier entity operator may scan a similar bar code symbol that is attached to the freight item and that specifies, for example the dimensions (or volume) and weight of the freight item. In some embodiments, the portable device may be operable to compute the amount of excess capacity from the scanned information. In other embodiments, the portable device may transmit the volume and weight information to global freight haulage job manager 22, and global freight haulage job manager 22 may be configured to compute the amount of excess capacity from this information.

Figure 4A:
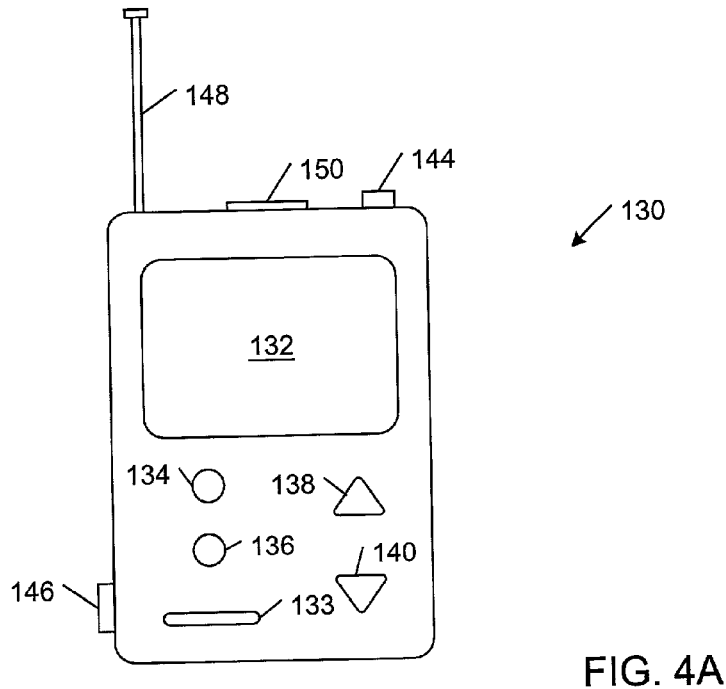
FIG. 4A is a diagrammatic front view of a portable device with which an operator of a mobile carrier entity may collect excess capacity information and wirelessly communicate with the global freight haulage job manager of FIG. 1.

Referring to FIG. 4A, in one embodiment, a portable device 130 includes a screen 132 that displays a graphical user interface, which may present one or more user options for controlling the operation of portable device 130. Portable device 130 also includes various user controls, including one or more control buttons 133, 134, 136, 138, 140. Portable device 130 has an output port 144 for connecting to an input jack of an audio output device (e.g., headphones), and a cable port 146 for connecting to a computer or other hardware system. Portable device 130 further includes an RF antenna 148 for communicating with communication satellite systems 30, 32. Portable device 130 also includes a scanner port 150 through which an optical beam may exit portable device 130 and scan across a symbol and through which optical reflections from the symbol may be transmitted for detection by a scanner module located within portable device 130.

Figure 4B:
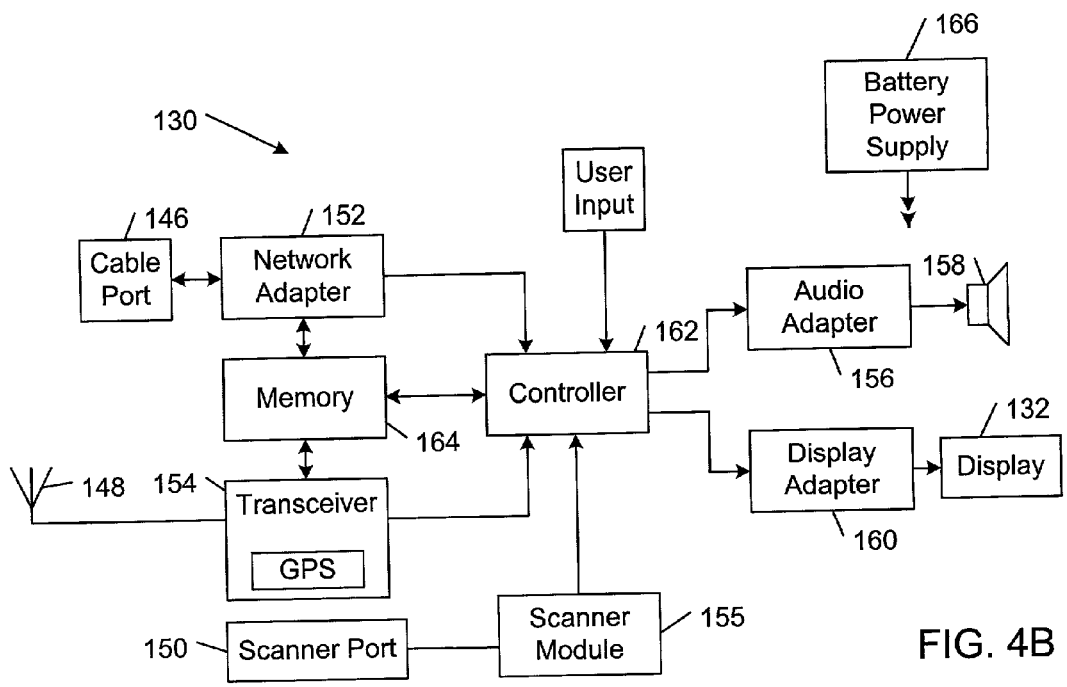
FIG. 4B is a block diagram of components of the portable system of FIG. 4A.

As shown in FIG. 4B, portable device 130 has a communication subsystem that includes a network adapter 152 that is configured to communicate through cable port 146 and a transceiver 154 that is configured to communicate via RF antenna 148. Transceiver 154 may incorporate, for example, a GPS receiver that is configured to compute position information from data received from multiple GPS satellite systems. Portable device 130 includes a conventional scanner module 155 that is configured to communicate through scanner port 150. Portable device 130 also may have a digital content rendering subsystem that includes an audio adapter 156 that is configured to transmit digital audio data signals to one or more speakers 158, and a display adapter 160 that is configured to transmit image data signals to display screen 132. A controller 162 is configured to control the operation of portable device 130. Portable device 130 also may have a memory 164 that may include a random access memory (RAM) and a read only memory (ROM). In some embodiments, one or more other storage technologies may be used, including an internal hard drive and a removable storage device (e.g., a removable hard drive, storage card or disk). A battery power supply 166 supplies the electrical power needed to operate portable device 130.

The systems and methods described herein are not limited to any particular hardware or software configuration, but rather they may be implemented in any computing or processing environment, including in digital electronic circuitry or in computer hardware, firmware or software. The global freight haulage manager 22, the service access software, and the control and capacity computation software for portable device 130 each may be implemented, in part, in a computer program product tangibly embodied in a machine-readable storage device for execution by a computer processor. In some embodiments, these modules preferably are implemented in a high level procedural or object oriented programming language; however, the algorithms may be implemented in assembly or machine language, if desired. In any case, the programming language may be a compiled or interpreted language. The methods described herein may be performed by a computer processor executing instructions organized, e.g., into program modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer program instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially-designed ASICs (application-specific integrated circuits).

Other embodiments are within the scope of the claims.

What is claimed is:

1. A computer-implemented method of allocating freight haulage jobs, comprising:

receiving from a first entity a respective set of capacity attributes for each of one or more freight-hauling mobile carrier entities on route to respective destinations for respective current freight haulage jobs, wherein each of the transmitted sets of capacity attributes comprises position information, route information and excess capacity information specifying current available freight-hauling capacity of the respective mobile carrier entity, wherein the received excess capacity information includes amount of available capacity and mode of transport;

computing a projection of future available carrier capacity based upon the received mobile carrier capacity attributes;

receiving from a second entity a respective specification for each of one or more freight haulage jobs;

determining ones of the mobile carrier entities that match respective ones of the freight haulage jobs based upon the computed projection of future available carrier capacity and the specifications of the freight haulage jobs, wherein the determining comprises identifying the matching ones of the mobile carrier entities based at least in part upon a comparison of the received excess capacity information and an amount of needed capacity and mode of transport specified for each of the freight haulage jobs; and transmitting to the second entity a notification of one or more of the matching mobile carrier entities.

2. The method of claim 1, wherein the computing comprises estimating future positions of one or more of the mobile carrier entities.

3. The method of claim 2, wherein the estimating comprises estimating the future positions of one or more of the mobile carrier entities at one or more times within pickup time windows specified for each of the freight haulage jobs.

4. The method of claim 2, wherein the estimating comprises estimating the future positions of one or more of the mobile carrier entities based at least in part upon current transport condition information.

5. The method of claim 2, wherein the determining comprises identifying the matching ones of the mobile carrier entities based at least in part upon the proximity of the estimated mobile carrier entity positions to pickup locations specified for each of the freight haulage jobs.

6. The method of claim 1, further comprising computing an amount of capacity available on a given one of the mobile carrier entities based upon excess capacity information received from the given mobile carrier entity.

7. The method of claim 6, wherein the excess capacity information received from the given mobile carrier entity includes maximum volume information and maximum weight haulable by the given mobile carrier entity and volume information and weight for each item of freight being hauled by the given mobile carrier entity.

8. A computer readable medium for allocating freight haulage jobs, the computer-readable medium comprising computer-readable instructions for causing a computer to:
receive from one or more users respective capacity attributes, including position information, route information and excess capacity information specifying available freight-hauling capacity, for each mobile carrier entity in a set of freight-hauling mobile carrier entities, wherein the received excess capacity information includes amount of available capacity and mode of transport;
compute a projection of available carrier capacity based upon the received mobile carrier capacity attributes; and
identify one or more freight haulage job candidates from the set of mobile carrier entities based upon the computed projection of available carrier capacity and shipping attributes for each of a set of freight haulage jobs, wherein the computer-readable instructions cause the computer to identify the one or more freight haulage job candidates based at least in part upon a comparison of the received excess capacity information and an amount of needed capacity and mode of transport specified for each of the freight haulage jobs.

9. The computer readable medium of claim 8, wherein computing the projection of available carrier capacity comprises estimating future positions of one or more of the mobile carrier entities.

10. The computer readable medium of claim 9, wherein future positions of one or more of the mobile carrier entities are estimated at one or more times within pickup time windows specified for each of the freight haulage jobs.

11. The computer readable medium of claim 10, wherein the freight haulage job candidates are identified based at least in part upon the proximity of the estimated mobile carrier entity positions to pickup locations specified for each of the freight haulage jobs.

12. The computer readable medium of claim 8, further comprising computing an amount of capacity available on a given mobile carrier entity based upon excess capacity information received from the given mobile carrier entity.

13. The computer readable medium of claim 12, wherein the excess capacity information received from the given mobile carrier entity includes maximum volume information and maximum weight haulable by the given mobile carrier entity and volume information and weight for each item of freight being hauled by the given mobile carrier entity.

14. A system, comprising:
a freight haulage job manager operable to perform operations comprising
receiving from a first entity a respective set of capacity attributes for each of one or more freight-hauling mobile carrier entities on route to respective destinations for respective current freight haulage jobs, wherein each of the transmitted sets of capacity attributes comprises position information, route information and excess capacity information specifying current available freight-hauling capacity of the respective mobile carrier entity, wherein the received excess capacity information includes amount of available capacity and mode of transport,
computing a projection of future available carrier capacity based upon the received mobile carrier capacity attributes,
receiving from a second entity a respective specification for each of one or more freight haulage jobs,
determining ones of the mobile carrier entities that match respective ones of the freight haulage jobs based upon the computed projection of future available carrier capacity and the specifications of the freight haulage jobs, wherein the determining comprises identifying the matching ones of the mobile carrier entities based at least in part upon a comparison of the received excess capacity information and an amount of needed capacity and mode of transport specified for each of the freight haulage jobs, and
transmitting to the second entity a notification of one or more of the matching mobile carrier entities; and
one or more portable devices each of which is carried by a respective one of the mobile carrier entities and comprises
a portable housing incorporating a display screen and one or more control buttons,
a memory in the housing;
a wireless transceiver in the housing,
a positioner in the housing and operable to compute position information,
a scanner in the housing and operable to direct a light beam at a symbol and to recover information embedded in the symbol based upon detected reflections from the symbol, and
a controller in the housing and coupled to the memory, the wireless transceiver, the positioner, and the scanner and operable to obtain from the scanner capacity attributes, including position information, route information and excess capacity information, for the respective mobile carrier entity and to control wireless transmission of the capacity attributes through the wireless transceiver in accordance with a mobile wireless communication protocol.

15. The system, of claim 14, wherein the positioner comprises a GPS receiver.

16. The system, of claim 14, wherein the controller is operable to compute excess capacity information from scanned information relating to maximum volume information and maximum weight haulable by a given mobile carrier entity and volume information and weight for each item of freight being hauled by the given mobile carrier entity.

17. The method of claim 1, wherein the receiving from the first entity comprises prompting the first entity to enter the respective capacity attributes.

18. The method of claim 1, further comprising selecting one of the matching mobile carrier entities to perform a particular one of the freight haulage jobs.

19. The method of claim 18, further comprising receiving respective haulage rates from ones of the mobile carrier entities, wherein the selecting is based at least in part on the received haulage rates.

20. The method of claim 1, wherein the excess capacity information is expressed in terms of volume and weight available on respective ones of the mobile carrier entities.

* * * * *

UNITED STATES PATENT AND TRADEMARK OFFICE
CERTIFICATE OF CORRECTION

PATENT NO.       : 7,353,181 B2
APPLICATION NO.  : 09/930640
DATED            : April 1, 2008
INVENTOR(S)      : André M. E. Nel It is certified that error appears in the above-identified patent and that said Letters Patent is hereby corrected as shown below:

In column 6, line 10, after "conventional" delete "5".

Signed and Sealed this

Twenty-second Day of July, 2008

JON W. DUDAS
*Director of the United States Patent and Trademark Office*